United States Patent
Karthik et al.

(10) Patent No.: US 12,147,316 B2
(45) Date of Patent: Nov. 19, 2024

(54) EVENT-BASED DATA SYNCHRONIZATION

(71) Applicant: Rubrik, Inc., Palo Alto, CA (US)

(72) Inventors: Vijay Karthik, Santa Clara, CA (US); Akhilesh Krishnan, Sunnyvale, CA (US); Dhawal Upadhyay, Mountain View, CA (US); Kevin Mu, Saratoga, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/185,960

(22) Filed: Mar. 17, 2023

(65) Prior Publication Data

US 2024/0311259 A1 Sep. 19, 2024

(51) Int. Cl.
*G06F 7/00* (2006.01)
*G06F 11/14* (2006.01)
*G06F 16/27* (2019.01)

(52) U.S. Cl.
CPC ...... *G06F 11/1469* (2013.01); *G06F 11/1464* (2013.01); *G06F 16/27* (2019.01); *G06F 2201/84* (2013.01)

(58) Field of Classification Search
CPC .. G06F 16/27; G06F 16/2358; G06F 16/1734; G06F 16/122; G06F 16/113; G06F 11/1469; G06F 11/1464; G06F 11/1448; G06F 11/3048; G06F 11/1687; G06F 2201/84; G06F 2201/86
See application file for complete search history.

(56) References Cited

U.S. PATENT DOCUMENTS

| | | | |
|---|---|---|---|
| 10,846,302 B1* | 11/2020 | Edukulla | G06F 16/27 |
| 2003/0126133 A1* | 7/2003 | Dattatri | G06F 16/2358 |
| 2012/0047214 A1* | 2/2012 | Daly | H04W 4/02 |
| | | | 709/206 |
| 2013/0117382 A1* | 5/2013 | Gaddam | H04L 51/58 |
| | | | 709/206 |
| 2018/0188899 A1* | 7/2018 | Nigam | G06Q 10/1095 |
| 2020/0117680 A1* | 4/2020 | Bapat | G06F 9/546 |
| 2023/0113327 A1* | 4/2023 | Banerjee | H04L 67/147 |
| | | | 709/226 |

\* cited by examiner

*Primary Examiner* — Mohammad A Sana
(74) *Attorney, Agent, or Firm* — Holland & Hart LLP

(57) ABSTRACT

Methods, systems, and devices for data management are described. A cloud data backup and recovery system may include a destination system and a source system. The destination system may be operable to provide backup and recovery services for the source system. The destination system may communicate a set of push/pull notifications with the source system. Each push/pull notifications may indicate an event is being performed in the source system. The destination system may determine an event is being performed in the source system based on transmitting a push notification or receiving a pull notification, where the push or pull notification may include metadata associated with the event. The destination system may retrieve, from the source system, data that is modified by the event based on the metadata. The destination system may synchronize a database of the destination system based on the data retrieved from the source system.

20 Claims, 11 Drawing Sheets

EVENT-BASED DATA SYNCHRONIZATION

FIELD OF TECHNOLOGY

The present disclosure relates generally to data management, including techniques for event-based data synchronization.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
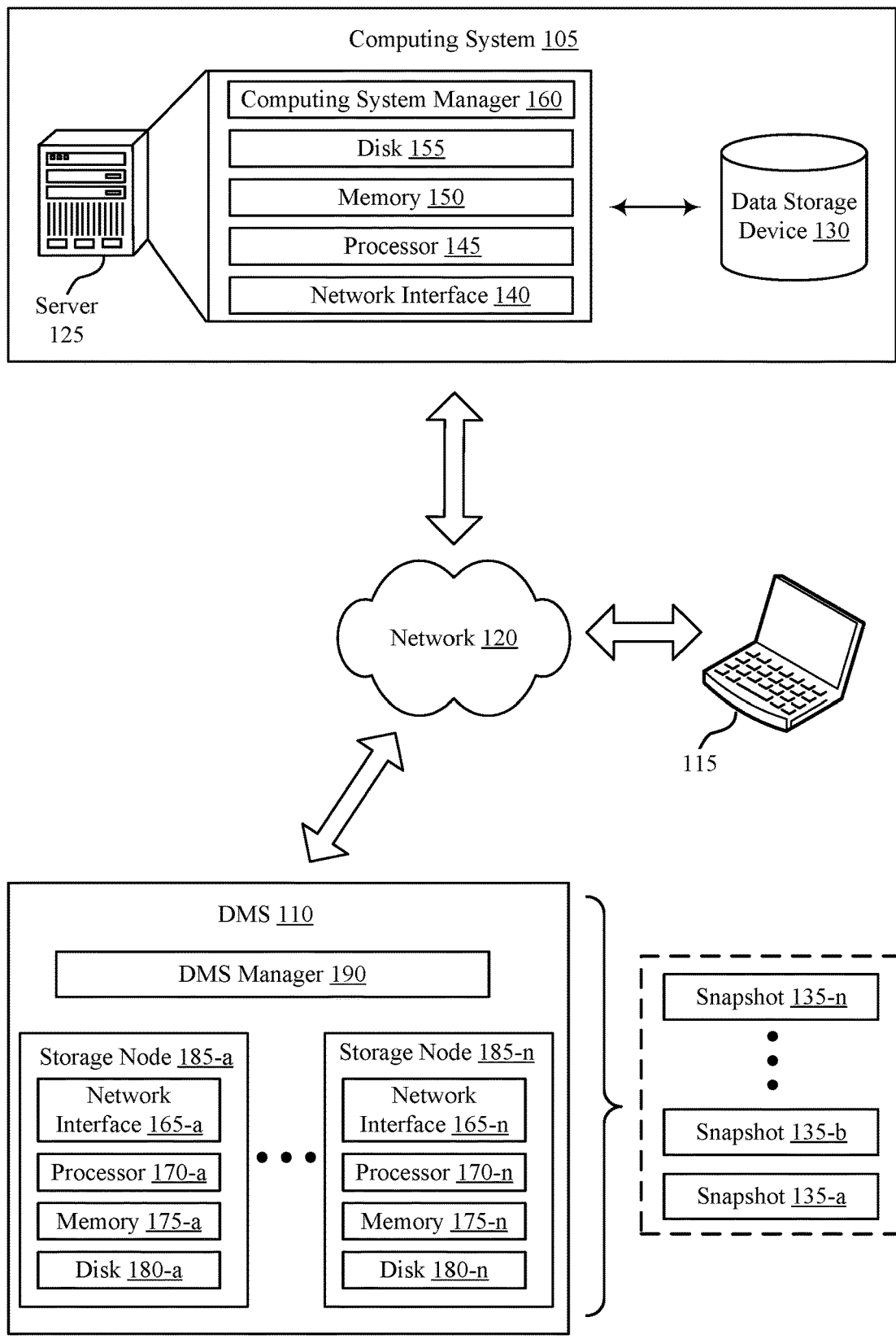
FIG. 1 illustrates an example of a computing environment that supports event-based data synchronization in accordance with aspects of the present disclosure.

In some computing systems, a data management system (DMS) may execute in a cloud environment, which may be referred to as a destination system herein. The DMS may manage client data (e.g., virtual machines (VMs), databases, applications, other data types, or any combination thereof) that may execute across different data centers, which may be referred to as source systems herein (e.g., cloud data management (CDM) clusters). Data stored in a data center may be changed or modified dynamically in response to an event performed in the data center (e.g., an operation performed by a client, a backup job, or other events). The event may be triggered by the DMS, by the data center, or by a client that has access to the DMS or the data center via a user interface. Techniques described herein provide for a DMS to dynamically synchronize a database at the DMS (e.g., a destination system) with data that is changed or modified in one or more data centers (e.g., a source system) in response to an event being triggered.

If the event is triggered by the destination system, the destination system may transmit a request (e.g., a push notification) that includes metadata associated with the event and requests the source system to initiate the event. The destination system may subsequently poll the source system to monitor a status of the event. For example, the destination system may periodically transmit an indication of the metadata associated with the event (e.g., an event identifier (ID) or other defining metadata) and a request for the event status to the source system. The destination system may retrieve data changed during the event based on the event status (e.g., at certain intervals during the event or after a success or failure of the event) and the defining metadata associated with the event. After retrieving the changed data, the destination system may synchronize with the source system by storing the changed data in a database at the destination system.

If the event is triggered in the source system, an event notification system may transmit a pull notification to the destination system to indicate the event is being performed. The pull notification may include metadata that identifies the event, a type of the event, a location of data affected by the event, or any combination thereof. The destination system may utilize a hook in response to the notification to identify data changed by the event and to synchronize the data in response to receiving the event notification. The destination system may retrieve the changed data from the source system based on the metadata in the event notification. After retrieving the changed data, the destination system may synchronize with the source system by storing the changed data in a database at the destination system. The destination system may thereby utilize a push/pull event notification system to dynamically update a database at the destination system based on events performed in a source system, which may improve reliability, coordination, and synchronization between systems in an automatic cloud data backup and recovery system.

FIG. 1 illustrates an example of a computing environment 100 that supports event-based data synchronization in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples of the computing environment 100, the DMS 110 may execute in a cloud environment, which may be referred to as a destination system herein. The DMS 110 may manage client data (e.g., VMs, databases, applications, etc.) that may execute across different data centers, which may be referred to as source systems herein (e.g., CDM clusters). For example, the DMS 110 may be operable to provide backup and recovery services for client data in the computing system 105, which may represent an example of a source system in some aspects herein. The DMS 110 and corresponding source system(s) may be referred to as an automatic cloud data backup and recovery system, in some examples. Data stored in a data center may be changed or modified dynamically in response to an event performed in the data center (e.g., an operation performed by a client, a backup job, or other events). The event may be triggered by the DMS 110, by the data center, or by a client that has access to the DMS 110 or the data center via a user interface (e.g., via the computing device 115). Techniques described herein provide for the DMS 110 to dynamically synchronize a database at the DMS 110 (e.g., a destination system) with data that is changed or modified in one or more data centers (e.g., a source system) in response to an event being triggered.

If the DMS 110 triggers the event, the DMS 110 may subsequently poll the source system to monitor a status of the event. For example, the DMS 110 may periodically transmit an indication of metadata associated with the event (e.g., an event ID or other defining metadata) and a request for the event status to the source system. The DMS 110 may retrieve data changed during the event based on the event status (e.g., at certain intervals during the event or after a success or failure of the event) and the defining metadata associated with the event. If the event is triggered in the source system, an event notification system may transmit a push/pull notification to the DMS 110 that identifies the event. The DMS 110 may utilize a hook in response to the notification to identify data changed by the event and to synchronize the data in response to receiving the event notification. In this example, the event notification may include metadata that identifies the data that is changed by the event and a type of the event. The DMS 110 may retrieve the changed data from the source system based on the metadata in the event notification. In either case, after retrieving the changed data, the DMS 110 may synchronize with the source system by storing the changed data in a database at the DMS 110.

Figure 2:
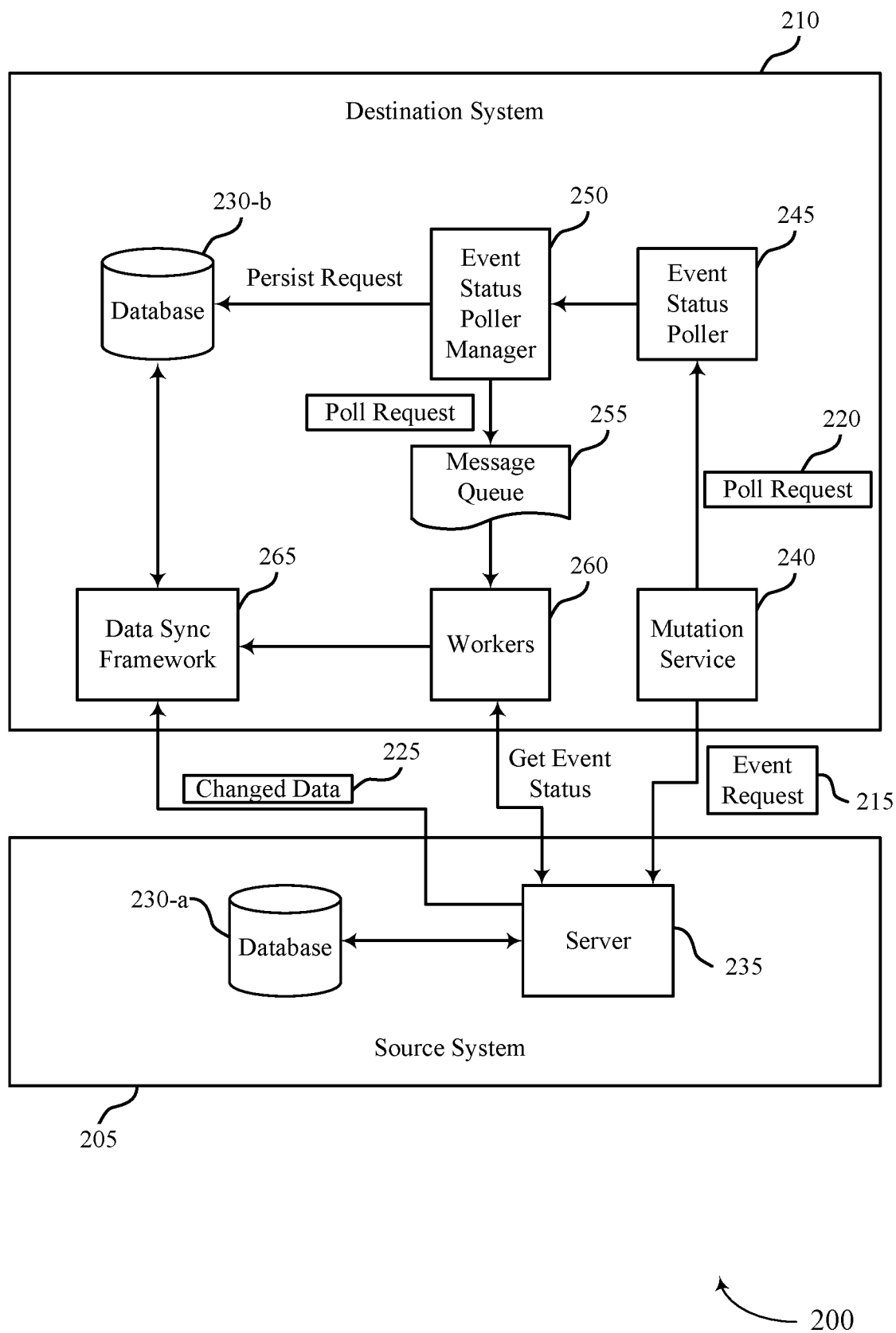
FIG. 2 illustrates an example of a computing environment that supports event-based data synchronization in accordance with aspects of the present disclosure.

FIG. 2 illustrates an example of a computing environment 200 that supports event-based data synchronization in accordance with aspects of the present disclosure. The computing environment 200 may implement or be implemented by aspects of the computing environment 100 described with reference to FIG. 1. For example, the computing environment 200 may represent an automatic cloud data backup and recovery system that includes a source system 205 and a destination system 210, as described with reference to FIG. 1.

In this example, the destination system 210 may represent an example of a cloud environment that hosts a DMS, such as the DMS 110 described with reference to FIG. 1. The DMS may manage client data (e.g., VMs, databases, applications, or the like) that may execute across different data centers or computing systems, such as the computing system 105 described with reference to FIG. 1. The data centers (e.g., a cloud data management (CDM) cluster) that are managed by the DMS operating in the destination system 210 may be referred to as source systems 205 herein.

The source system 205 may include or be coupled with, for example, a database 230-*a* and a server 235 (e.g., an application programming interface (API) server, or some other type of server), which may represent examples of a database and a server 125 as described with reference to FIG. 1. In some examples, the destination system 210 may include or be coupled with one or more components including, for example, a mutation service 240, an event status poller 245, an event status poller manager 250, a database 230-*b*, a message queue 255, one or more workers 260, a data sync framework 265, or any combination thereof. Each of the components of the destination system 210 may perform a respective job or task related to initiating an event in the source system 205 and synchronizing data that is changed by the event. Although each of these components are illustrated in FIG. 2, it is to be understood that the process to synchronize data with a source system 205 based on an event may be performed by one or more components of a destination system 210 or a source system 205, including the components illustrated in FIG. 2 or other components not shown. Additionally, or alternatively, one or more components may perform tasks or may be configured to function in a different manner than illustrated in FIG. 2.

Data that is stored in a source system 205 may be changed or modified dynamically in response to an event performed in the source system 205. That is, an event may be something that changes or modifies data in the database 230-*a* of the source system 205. The data that is changed during the event may be referred to as changed data 225. The event may be, for example, an operation performed by a client, a data backup job, or some other type of event. The event may be initiated by the destination system 210 or by the source system 205. The automatic cloud data backup and recovery system may support a push/pull notification system that notifies the destination system 210 when an event is occurring in the source system 205. Techniques described herein provide for the destination system 210 to leverage the push/pull event notifications to synchronize changed data 225 from the source system 205 to the destination system 210 based on events.

In the example of FIG. 2, the destination system 210 may initiate (e.g., trigger or cause) an event in the source system 205. The destination system 210 may initiate the event based on a periodic job (e.g., to perform a periodic backup) or a trigger, such as input from a user or a condition associated with the automatic cloud data backup and recovery system. For example, a user may be logged in to a DMS associated with the destination system, and an operation performed by the user when logged in to the DMS may trigger the event. To initiate the event, the mutation service 240 or some other component of the destination system 210 may transmit an event request 215 to the source system 205. The event request 215 may represent an example of a push notification that triggers an event. In some examples, the mutation service 240 may perform an action that initiates an event in the source system 205, and the action performed by the mutation service 240 may represent an example of the event request 215. The server 235 of the source system 205 may receive the event request 215 or identify the action performed by the mutation service 240 and may, in some examples, transmit an event trigger response to the destination system 210. The event trigger response may include details associated with the event.

The mutation service 240 may generate a poll request 220 based on metadata associated with the event. The poll request 220 may include a request to sync data in the source system 205 that has been updated by the event. The mutation service 240 may determine the metadata based on initiating the event, performing the action, or both. In some examples, the metadata may be included in the event request 215, the event trigger response, or both. The metadata may indicate, for example, a type of the event, a quantity of data modified by the event, an address of the modified data, an ID of the event, other defining metadata, or any combination thereof.

The mutation service 240 may send the poll request 220 to the event status poller 245 to poll and sync the data that has been updated by the event. The event status poller 245 may forward the poll request 220 to the event status poller manager 250. The event status poller manager 250 may persist the poll request 220 in the database 230-*b* of the destination system 210. The event status poller manager 250 may store the poll request 220 in the database 230-*b* for use in case of subsequent failure of the destination system 210. For example, if, after the poll request 220 is stored in the database 230-*b*, there is corruption or failure of the destination system 210 (e.g., due to a ransomware attack or other disaster scenario) that causes the destination system 210 to restart the process, the destination system 210 may retrieve the poll request 220 from the database 230-*b*. The destination system 210 may thereby refrain from requesting for the metadata for the event from the source system 205 and re-generating the poll request 220, which may reduce latency and complexity in disaster recovery scenarios.

The event status poller manager 250 may additionally, or alternatively, publish the poll request 220 to a message queue 255 of the destination system 210. The message queue 255 may be a linked list of messages or jobs to be performed by the destination system 210. Messages may be stored in the message queue 255 in order until they are processed and deleted. Each message may be processed once before deletion, in some examples.

The destination system 210 may include one or more workers 260 for synchronizing data based on events. The workers 260 may represent examples of one or more software or hardware components that are operable to retrieve tasks from the message queue 255 and perform the tasks for the destination system 210. In some aspects, the workers 260 may be coupled with or otherwise associated with the event status poller 245. The workers 260 may consume the poll request 220 from the message queue 255. The workers 260 may execute the tasks associated with or indicated by the poll request 230 for the event status poller 245. For example, the workers 260 may start polling the source system 205 based on the poll request 220. In some examples, the workers 260 may auto scale depending on a quantity of poll requests 220 that are in the message queue 255 at any given time.

To poll the source system 205, the workers 260 may periodically or semi-statically poll for status information that indicates a status of the event being performed in the source system 205 (e.g., the workers 260 may get or retrieve an event status). The workers 260 may poll the source system 205 in accordance with instructions included in the poll request 230. For example, the poll request 230 may include a handler (e.g., a routine, function, or method, referred to as EventStatusPollerHandler, for example) that may indicate a periodicity for polling the source system 205, tasks to perform based on a status of the event, a timeout for the polling job (e.g., a function, such as GetPollTimeout( ), that defines the timeout), or any combination thereof.

A polling interval or periodicity may be defined by the mutation service 240 and indicated via the poll request 220. Additionally, or alternatively, the poll request 220 may indicate a function (e.g., GetPollInterval( )) that defines the polling interval. The polling interval or periodicity may be fine-tuned by the destination system 210 based on use cases, the type of the event, or both. In some examples (e.g., for service level agreement (SLA)-based poll intervals), the polling intervals may be different based on how long the poller workers 260 have been polling the source system 205. For example, a first poll interval may be set for a first period of time (e.g., polling every five seconds for the first two minutes of polling, or some other interval) and a second poll interval may be set for a second period of time after the first period of time (e.g., polling every two minutes for up to 30 more minutes, or some other time interval). Such poll intervals may be based on customer behavior. For example, a customer may check a user interface relatively frequently for the first few minutes to see whether the data has changed after triggering an event, and the frequency of checks by the customer may reduce over time. As such, the destination system 210 may reduce the polling frequency over time to reduce overhead, processing, and resource consumption. In such cases, the polling intervals may be defined by a duration and frequency, and the destination system 210 may count the polling intervals consecutively.

The workers 260 may thereby poll the source system 205 for status information at the indicated poll intervals until the timeout duration expires or until a complete status is received. The polling may be a stateful, scalable, and relatively fault tolerant service for polling a status of an event in the source system 205 and executing functions depending on the state of the event. The server 235 at the source system 205 may provide the status information to the workers 260 based on the polling. The status information may indicate, for example, whether the event is complete or still pending. A complete status may indicate that the event was successful or unsuccessful. A pending status may indicate a time duration over which the event has been pending, or some other information that indicates a status of the event being performed at the source system 205.

The destination system 210 may include data sync framework 265 that is operable to synchronize data stored at the database 230-*b* of the destination system 210 with source data that is modified by the event based on the status information associated with the event. The workers 260 may send a sync metadata request to the data sync framework 265 based on the status information received from the source system 205 to initiate the synchronization. In some examples, the data sync framework 265 may synchronize the changed data during the course of the event. Additionally, or alternatively, the data sync framework 265 may synchronize the changed data after the event reaches a terminal state (e.g., is complete). The timing for synchronization may be defined by a function included in the poll request 220 and may be based on a type of the event, a type of the data changed by the event, or both.

If the event being performed in the source system 205 updates or changes data incrementally over time, the destination system 210 may synchronize data throughout the course of the event to synchronize the incremental changes. One example of such an event may include a customer of the DMS adding a virtual center. The customer may add information related to the virtual center, such as an ID, to the user interface. The DMS may perform a background job to use the virtual center information to discover other information or computing objects (e.g., VMs) under or within the virtual center. As the VMs are discovered, they are updated in the DMS. However, the event is not complete until all VMs of the virtual center are discovered. Accordingly, to maintain up-to-date synchronization with the VMs as they are being discovered, the destination system 210 may dynamically synchronize data incrementally during such an event.

In some examples, for other types of events, the destination system 210 may not synchronize the data until after the event has reached a terminal state, which may be a success or failure of the event. For example, the poll request 220 may include one or more functions to be executed by the destination system 210 when the event reaches a terminal state (e.g., an OnSuccess command, an OnFailure command, or other types of commands). After receiving status information that indicates the event is compete, the destination system 210 may synchronize changed data based on the functions or commands included in the poll request 220.

To synchronize the data after the event or during the event, the data sync framework 265 may retrieve the changed data 225 from the source system 205. The data sync framework 265 may transmit a request to retrieve the data to the server 235 of the source system 205. The request may include an ID of the event, an address of the changed data 225 in the source system 205, or other metadata associated with the event based on the poll request 220. The server 235 may retrieve the changed data 225 from the database 230-a or other data storage location in the source system 205 and may transmit the changed data 225, metadata associated with the changed data 225, or both to the data sync framework 265. The data sync framework 265 may synchronize the database 230-b at the destination system 210 based on the changed data 225. In some examples, the data sync framework 265 may persist the changed data 225 to the database 230-b. The changed data 225 may overwrite previous data or may be stored as an updated version of the previous data in the database 230-b. In some examples, the data sync framework 265 may write the changed data 225 as incremental data or backups that may be linked to other previous incremental data in the database 230-b.

In some examples, after success or failure of an event, the destination system 210 may additionally, or alternatively, delete data from the database 230-b. For example, the destination system 210 may remove data that was deleted from the database 230-a at the source system 205 as part of the event.

The described techniques provide for a destination system 210 to use information about an event triggered or initiated by the destination system 210 to poll (e.g., constantly or periodically) for status information related to the event and synchronize associated data accordingly. The described techniques may provide for a scalable and relatively fault-tolerant mechanism for synchronizing data from the source system 205 to the destination system 210 based on an event. In some examples, the event may be triggered by the source system 205, and the destination system 210 may utilize a notification system to identify the event and synchronize data accordingly. Techniques for synchronizing data when an event is triggered in the source system 205 are described in further detail elsewhere herein, including with reference to FIGS. 3 and 4.

Figure 3:
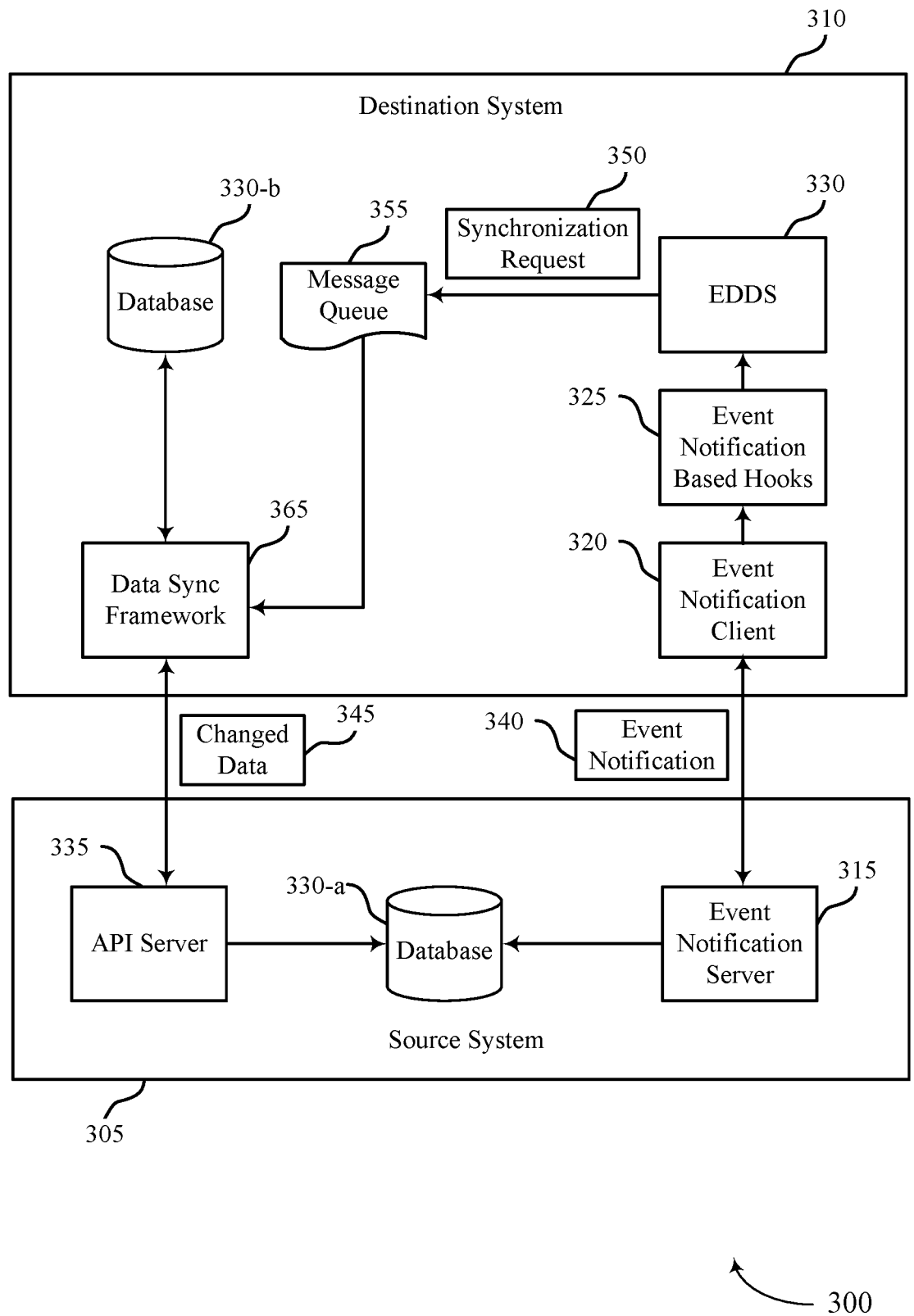
FIG. 3 illustrates an example of a computing environment that supports event-based data synchronization in accordance with aspects of the present disclosure.

FIG. 3 illustrates an example of a computing environment 300 that supports event-based data synchronization in accordance with aspects of the present disclosure. The computing environment 300 may implement or be implemented by aspects of the computing environment 100 or the computing environment 200 described with reference to FIGS. 1 and 2. For example, the computing environment 300 may represent an automatic cloud data backup and recovery system that includes a source system 305 and a destination system 310, as described with reference to FIGS. 1 and 2.

In this example, the destination system 310 may represent an example of a cloud environment that hosts a DMS, such as the DMS 110 described with reference to FIG. 1. The DMS may manage client data (e.g., VMs, databases, applications, or the like) that may execute across different data centers or computing systems, such as the computing system 105 described with reference to FIG. 1. The data centers (e.g., a CDM cluster) that are managed by the DMS operating in the destination system 310 may be referred to as source systems 305 herein.

The source system 305 may include or be coupled with, for example, a database 330-a, an API server 335, and an event notification server 315, which may represent examples of a database and a server as described with reference to FIGS. 1 and 2. In some examples, the destination system 310 may include or be coupled with one or more components including, for example, an event notification client 320, a set of one or more event notification based hooks 325, an event driven data syncer (EDDS) 330, a database 330-b, a message queue 355, a data sync framework 365, or any combination thereof. Each of the components of the destination system 310 may perform a respective job or task related to receiving an event notification 340 that indicates an event is being performed in the source system 305 and synchronizing data that is changed by the event. Although each of these components are illustrated in FIG. 3, it is to be understood that the process to synchronize data with a source system 305 based on an event may be performed by one or more components of a destination system 310 and a source system 305, including the components illustrated in FIG. 3 or other components not shown. Additionally, or alternatively, one or more components may perform tasks or may be configured to function in a different manner than illustrated in FIG. 3.

Data that is stored in a source system 305 may be changed or modified dynamically in response to an event performed in the source system 305. The data that is changed during the event may be referred to as changed data 345. The event may be, for example, an operation performed by a client, a data backup job, or some other type of event. The event may be initiated by the destination system 310 or by the source system 305. The automatic cloud data backup and recovery system may support a push/pull notification system that notifies the destination system 310 when an event is occurring in the source system 305. Techniques described herein provide for the destination system 310 to leverage the push/pull event notifications to synchronize changed data 345 from the source system 305 to the destination system 310 based on events.

In the example of FIG. 3, the source system 305 may initiate (e.g., trigger or cause) an event in the source system 305. For example, the event may be initiated by a user or by a background job running in the source system 305. The source system 305 may include or support an event notification server 315 or some other component or server that is operable to notify the destination system 310 of events being performed in the source system 305. In some examples, the source system 305 and the destination system 310 may support a push/pull notification system for events. If an event is initiated in the source system 305, the event notification server 315 may generate an event notification 340 and transmit the event notification 340 to the destination system 310. The event notification 340 may be a push or pull notification that indicates the event is occurring and includes metadata associated with the event. The metadata may include, for example, an ID of the event, a type of the event, a time associated with the event, an address or size of data changed by the event, other defining metadata associated with the event, or any combination thereof (e.g., the metadata may indicate that a backup of a VM with ID #1 was taken at 10:00 am, as an example). The event notification 340 may be received by an event notification client 320 or some other component of the destination system 310.

Techniques, systems, and devices described herein provide for the destination system 310 to include or utilize one or more event notification based hooks 325 to trigger data synchronization based on a received event notification 340. The event notification based hooks 325 may represent examples of software or some other component that is operable to execute in response to an event notification 340 being received. The event notification based hooks 325 may trigger the destination system 310 to process each event in response to receiving an event notification 340. The EDDS 330 may process the event based on the event notification hooks 325 detecting the event notification 340. In some examples, the destination system 310 may include or be coupled with a notification system that may include the event notification client 320, the event notification based hooks 325, the EDDS 330, the event notification server 315, one or more other components, or any combination thereof.

The EDDS 330 may read metadata associated with each event and identify the changed data 345 in the source system 305 based on the metadata. For example, the EDDS 330 may identify one or more rows of data that have changed in the source system 305 or one or more tables in the source system 305 that have been updated, or both based on the metadata. In some examples, the metadata may indicate an object type associated with the event. The object type may refer to a type of the changed data 345. The object type may indicate how to read metadata associated with the event and which objects or data to synchronize. The metadata may additionally, or alternatively, indicate a type of the event. For example, the metadata may indicate whether the event is a backup job, a snapshot, or some other operation performed in the source system 305.

The EDDS 330 may utilize a handler to reach the metadata from the event and identify the changed data 345. A handler may represent a routine or function for performing a certain task. The EDDS 330 may support different handlers for different types of events performed in the source system 305 and different types of objects (e.g., each app team may define a handler for a given event type, object type pair, referred to as EventTypeHandlers). The handlers may read the metadata from the event and return the tables and row IDs that may be modified by the event and are to by synchronized. In some examples, a function, such as GetObjectsToSync, or some other function may define logic that the handlers may implement to read the metadata and identify the location of the changed data 345. The handlers may forward this information to the EDDs 330.

In some examples, one or more handlers may be defined for certain types of events. For example, a backup handler may be supported by the EDDS 330 and may support synchronization of a snapshots table based on an event associated with a snapshot or other backup operation or job. The snapshots table may store information about every backup taken in the source. Any event associated with a snapshot may be associated with a standard snapshot metadata format. The EDDS 330 may utilize the standardization of metadata formats for snapshot events to identify events associated with the snapshots table (e.g., and one or more other tables depending on an object the snapshots are taken for). The EDDS 330 may thereby handle synchronization based on backup events within the EDDS 330 without utilizing a defined backup event handler. The application team may thereby refrain from defining an additional backup handler, which may reduce costs and time associated with development and maintenance of the described systems.

After determining the changed data 345 (e.g., using the handlers), the EDDS 330 may generate a data synchronization request 350. The synchronization request 350 may include the metadata associated with the event being performed in the source system 305 and instructions for synchronizing the changed data 345 based on the event. The EDDS 330 may publish the synchronization request 350 to a message queue 355. The message queue 355 may represent an example of the message queue 255 described with reference to FIG. 2. For example, the message queue 355 may be a linked list of messages or jobs to be performed by the destination system 310. Messages may be stored in the message queue 355 in order until they are processed and deleted. Each message may be processed once before deletion, in some examples.

The destination system 310 may include data sync framework 365 that is operable to synchronize data stored at the database 330-b of the destination system 310 with source data that is modified by the event based on the status information associated with the event. The data sync framework 365 may represent an example of the data sync framework 265 described with reference to FIG. 2. In this example, the data sync framework 365 may pull the synchronization request 350 from the message queue 355 and may perform data synchronization in accordance with the synchronization request 350.

To synchronize the data after the event or during the event, the data sync framework 365 may retrieve the changed data 345 from the source system 305. The data sync framework 365 may transmit a request to retrieve the data to the API server 335 of the source system 305. The request may include an ID of the event, an address of the changed data 345 in the source system 305, or other metadata associated with the event based on the synchronization request 350. The API server 335 may retrieve the changed data 345 from the database 330-a or other data storage location in the source system 305 and may transmit the changed data 345, metadata associated with the changed data 345, or both to the data sync framework 365. The data sync framework 365 may synchronize the database 330-b at the destination system 310 based on the changed data 345. In some examples, the data sync framework 365 may persist the changed data 345 to the database 330-b. The changed data 345 may overwrite previous data or may be stored as an updated version of the previous data in the database 330-b. In some examples, the data sync framework 365 may write the changed data 345 as incremental data or backups that may be linked to other previous incremental data in the database 330-b. In some examples, the destination system 310 may additionally, or alternatively, delete data from the database 330-b. For example, the destination system 310 may remove data that was deleted from the database 330-a at the source system 305 as part of the event.

When an event is triggered or initiated in the source system 305, the destination system 310 may not be aware of the event, which may provide for the destination system 310 to be unable to poll for an event status, as described with reference to FIG. 3. Accordingly, the described techniques provide for a destination system 310 to utilize a push/pull notification system to be notified of events, read metadata associated with an event, identify changed data or tables where data could have been changed by the event, and synchronize the identified data. The described techniques may provide for a scalable and relatively fault-tolerant mechanism for synchronizing data from the source system 305 to the destination system 310 based on an event. In some examples, the event may be triggered by the destination system 310, and the destination system 310 may utilize metadata associated with the event to poll for an event status and synchronize data accordingly, as described in further detail elsewhere herein, including with reference to FIGS. 2 and 4.

Figure 4:
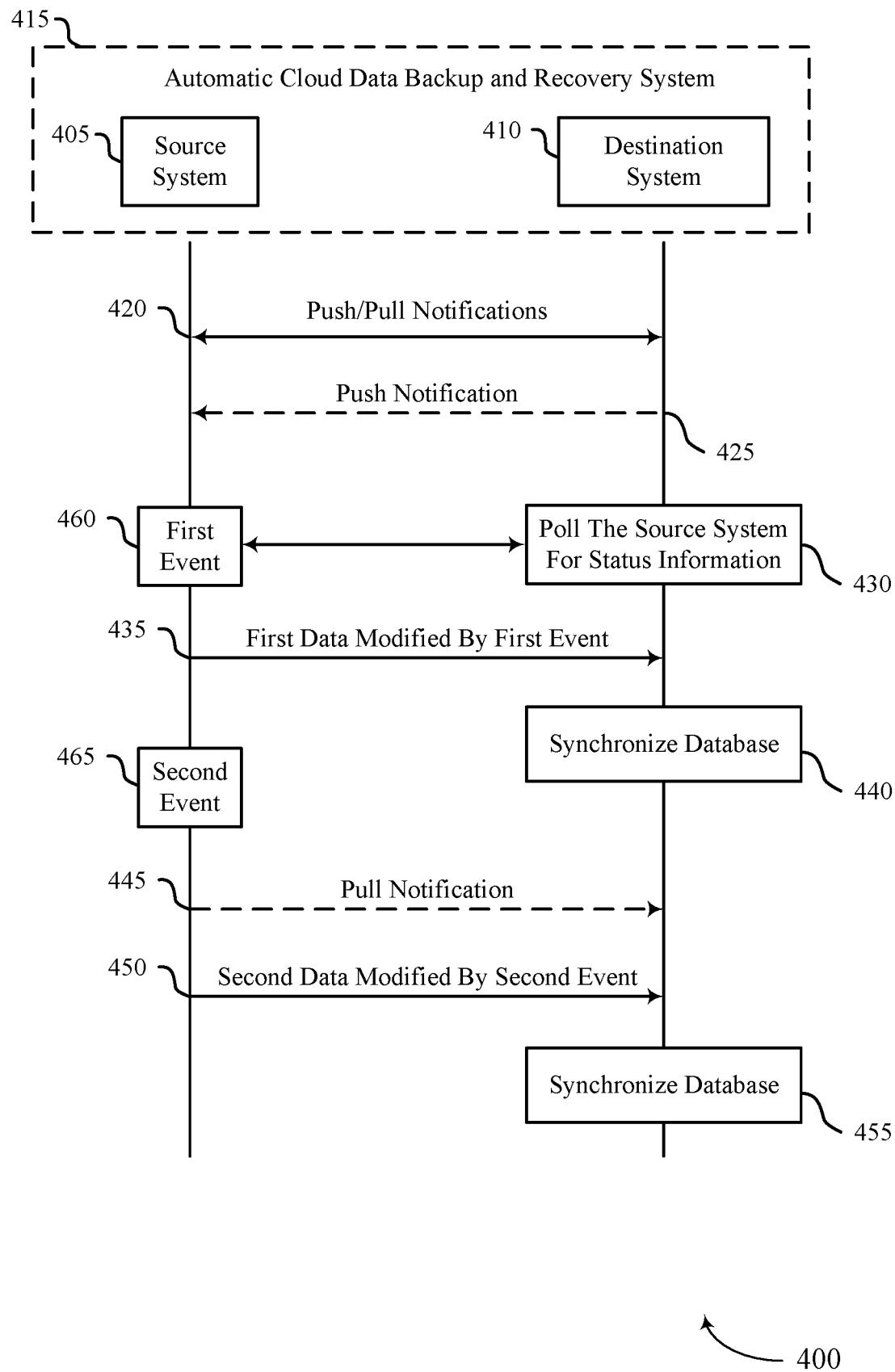
FIG. 4 illustrates an example of a process flow that supports event-based data synchronization in accordance with aspects of the present disclosure.

FIG. 4 illustrates an example of a process flow 400 that supports event-based data synchronization in accordance with aspects of the present disclosure. The process flow 400 may implement or be implemented by aspects of the computing environments 100, 200, and 300, as described with reference to FIGS. 1-3. For example, the process flow 400 may be implemented by a source system 405 in an automatic cloud data backup and recovery system 415 and a destination system 410 in the automatic cloud data backup and recovery system 415, which may represent examples of corresponding systems as described with reference to FIGS. 1-3. The destination system may include or be in communication with one or more components of a DMS, which may represent examples of corresponding devices and components as described with reference to FIGS. 1-3. In this example, the destination system 410 may synchronize a database of the destination system 410 with a database of the source system 405 based on an event being performed in the source system 405.

In some aspects, the operations illustrated in the process flow 400 may be performed by hardware (e.g., including circuitry, processing blocks, logic components, and other components), code (e.g., software or firmware) executed by a processor, or any combination thereof. For example, aspects of the process flow 400 may be implemented or managed by a DMS, an event-based synchronization component, or some other software or application within a DMS that is configured to manage backup and restoration of data and other computing resources within an automatic cloud data backup and recovery system.

At 420, the destination system 410 may communicate a set of one or more push/pull notifications with the source system 405. Each push/pull notification of the set may indicate a respective event is being performed in the source system 405. In some examples, the destination system 410 may be operable to provide backup and recovery services for the source system 405 in the automatic cloud data backup and recovery system 415. For example, the destination system 410 may represent a cloud environment that hosts a DMS, or may include or be in communication with one or more components of a DMS that manages data in the source system 405.

At 425, in some examples, the destination system 410 may transmit a push notification to the source system 405. The push notification may be one of the set of push/pull notifications communicated at 420. The push notification may include a request to initiate a first event 460 in the source system 405. The destination system 410 may send the push notification based on determining to initiate the first event 460 in the source system 405, as described with reference to FIG. 2. In some examples, the destination system 410 may trigger the first event 460, or a client may be logged in to the destination system 410 and may request the first event 460 be performed. The push notification may indicate or include first metadata associated with the first event 460, such as an ID of the first event 460, a type of the first event 460, or other metadata.

At 430, the destination system 410 may poll the source system 405 for status information that indicates a status of the first event 460 being performed in the source system 405. The destination system 410 may poll the source system 405 based on the push notification and the first metadata included in the push notification. The destination system 410 may poll the source system 405 periodically or semi-statically over a time period based on a type of the first event 460, as described with reference to FIG. 2. In some examples, the destination system 410 may include one or more components that are operable to generate a status request, publish the status request to a message queue or store the status request in a database, retrieve the status request from the message queue, and poll the source system 405 based on the status request, as described in further detail elsewhere herein, including with reference to FIG. 2.

At 435, the destination system 410 may retrieve, from the source system 405, first data that is modified by the first event 460. The destination system 410 may retrieve the first data in accordance with the status of the first event 460 and using the first metadata associated with the first event 460. In some examples, the destination system 410 may retrieve the first data based on the status information indicating that the first event 460 is complete. Additionally, or alternatively, the destination system 410 may incrementally retrieve the first data during the first event 460. The first metadata indicated via the push notification may indicate an ID of the first event 460, a type of the first event 460, and a location of the first data in the source system 405.

At 440, the destination system 410 may synchronize a database of the destination system 410 with a database of the source system 405 based on the first data retrieved from the source system 405. For example, the destination system 410 may write the first data to the database. The first data may overwrite previous data, or may be added in addition to the previous data. The database at the destination system 410 may thereby be updated and synchronized with the database at the source system 405 after the first event 460 is performed.

At 445, in some examples, the destination system 410 may receive a pull notification from the source system 405. The pull notification may be one of the set of push/pull notifications. The pull notification may indicate that a second event 465 is being performed in the source system 405. The pull notification may indicate second metadata associated with the second event 465, such as a type of the second event 465, an ID of the second event 465, one or more rows or tables of a database at the source system 405 that are modified by the second event 465, other metadata, or any combination thereof.

At 450, the destination system 410 may retrieve, from a database at the source system 405, second data that is modified by the second event 465 based on the pull notification. The destination system 410 may retrieve the second data based on a type of the second event 465, based on the location information indicated via the pull notification, or both. In some examples, the destination system 410 may include or utilize one or more hooks that may hook to the pull notification indicating the second event 465 and may trigger a data synchronization process as described herein. The destination system 410 may retrieve the second data based on the hooks.

In some examples, the destination system 410 may include an EDDS, such as the EDDS 330 described with reference to FIG. 3. The pull notification may include an implicit or explicit request for the EDDS to process the second event 465. The EDDS may read the second event 465 and identify the second metadata to perform the data retrieval and synchronization. In some examples, the destination system 410 may process the second event 465 differently based on a type of the second event 465, as described in further detail elsewhere herein, including with reference to FIG. 3.

At 455, the destination system 410 may synchronize a database of the destination system 410 with a database of the source system 405 based on the second data retrieved from the source system 405. For example, the destination system 410 may write the second data to the database. The second data may overwrite previous data, or may be added in addition to the previous data. The database at the destination system 410 may thereby be updated and synchronized with the database at the source system 405 after the second event 465 is performed.

The destination system 410 may thereby be operable to detect when an event is occurring in the source system 405 and synchronize a database of the destination system based on the event, regardless of whether the event is initiated in the source system 405 or initiated by the destination system 410. The described techniques may provide for an automatic cloud data backup and recovery system 415 that is operable to reliably and efficiently maintain data synchronization between a source system 405 and a destination system 410 even when different types of events that modify data in the source system 405 are performed. A client of the automatic cloud data backup and recovery system 415 may consume or view data from the destination system 410 (e.g., via a user log-in session with a DMS). Accordingly, by maintaining synchronization with the source system 405, the destination system 410 may accurately and reliable provide data backup and protection services to one or more clients.

Although the process flow 400 is illustrated as a single flow, it is to be understood that one or more of the steps or operations shown in the process flow 400 may be performed in conjunction with or separately from the other operations. For example, the destination system 410 may initiate an event, poll for status information, and synchronize the database accordingly with or without also receiving a pull notification that indicates an event and synchronizing the database accordingly, or vice versa. In some examples, the operations described by 420, 425, 430, 435, and 440 may be performed as a first process by the automatic cloud data backup and recovery system 415, and the operations described by 445, 450, and 455 may be performed as a second process by the automatic cloud data backup and recovery system 415. In some examples, the destination system 410 may trigger multiple events in the source system 405 consecutively, in which case the destination system 410 may repeat the operations of 420-440 for each event. Additionally, or alternatively, the destination system 410 may receive multiple pull notifications indicating multiple consecutive events in the source system 405, in which case the destination system 410 may repeat the operations of 445-455 for each event.

Figure 5:
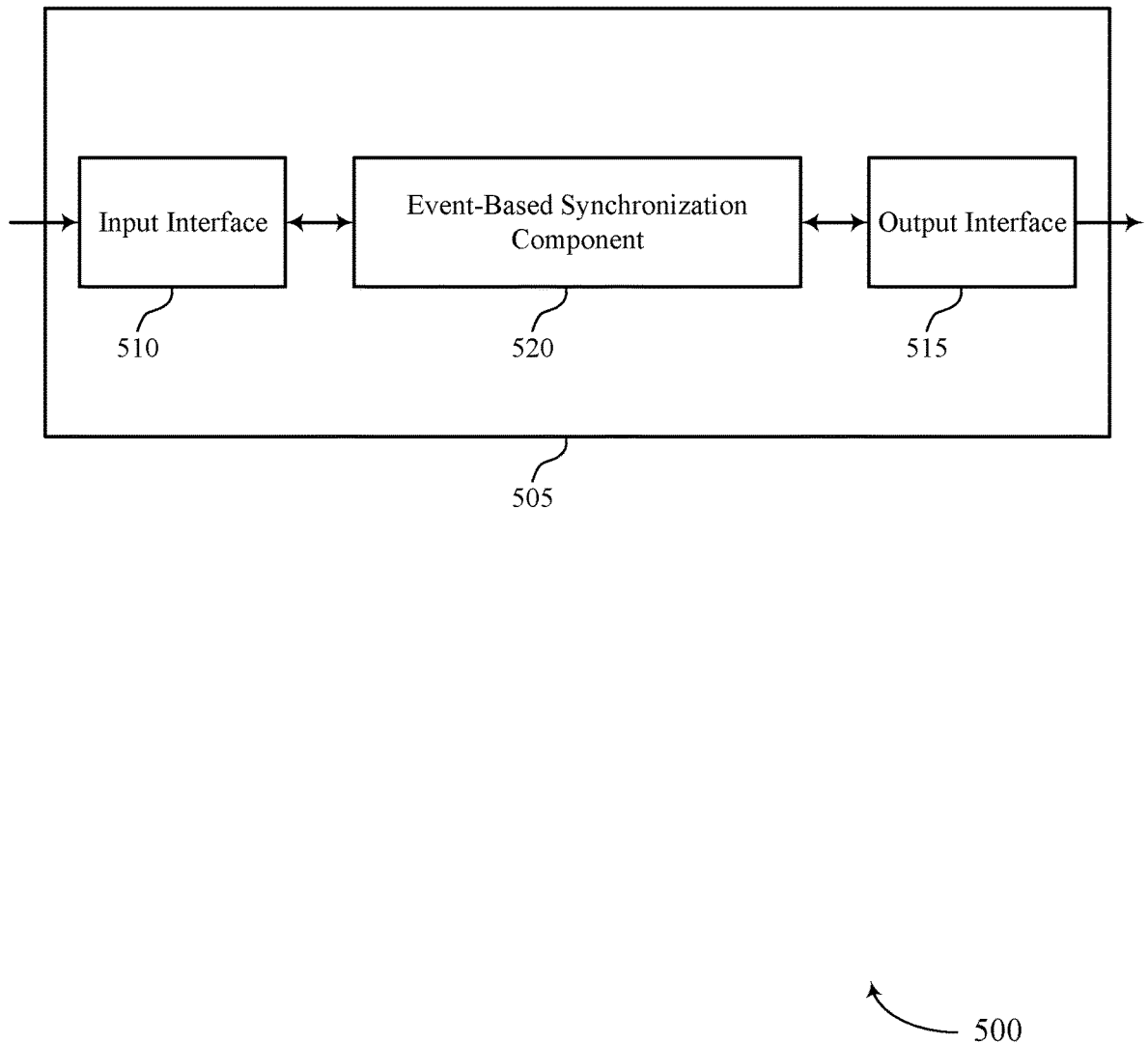
FIGS. 5 and 6 illustrate block diagrams of devices that support event-based data synchronization in accordance with aspects of the present disclosure.

FIG. 5 illustrates a block diagram 500 of a system 505 that supports event-based data synchronization in accordance with aspects of the present disclosure. The system 505 may be an example of aspects of a DMS as described herein. The system 505 may include an input interface 510, an output interface 515, and an event-based synchronization component 520. The system 505 may also include a processor. Each of these components may be in communication with one another (e.g., via one or more buses).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the event-based synchronization component 520 to support event-based data synchronization. In some cases, the input interface 510 may be a component of a network interface 825 as described with reference to FIG. 8.

The output interface 515 may manage output signaling for the system 505. For example, the output interface 515 may receive signaling from other components of the system 505, such as the event-based synchronization component 520, and may transmit such output signaling corresponding to (e.g., representative of or otherwise based on) such signaling to other systems or devices. In some cases, the output interface 515 may be a component of a network interface 825 as described with reference to FIG. 8.

The event-based synchronization component 520, the input interface 510, the output interface 515, or various combinations thereof or various components thereof may be examples of means for performing various aspects of event-based data synchronization as described herein. For example, the event-based synchronization component 520, the input interface 510, the output interface 515, or various combinations or components thereof may support a method for performing one or more of the functions described herein.

In some examples, the event-based synchronization component 520, the input interface 510, the output interface 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the event-based synchronization component 520, the input interface 510, the output interface 515, or various combinations or components thereof may be implemented in code (e.g., as communications management software or firmware) executed by a processor. If implemented in code executed by a processor, the functions of the event-based synchronization component 520, the input interface 510, the output interface 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the event-based synchronization component 520 may be configured to perform various operations (e.g., receiving, monitoring, transmitting) using or otherwise in cooperation with the input interface 510, the output interface 515, or both. For example, the event-based synchronization component 520 may receive information from the input interface 510, send information to the output interface 515, or be integrated in combination with the input interface 510, the output interface 515, or both to receive information, transmit information, or perform various other operations as described herein.

For example, the event-based synchronization component 520 may be configured as or otherwise support a means for communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The event-based synchronization component 520 may be configured as or otherwise support a means for polling, by the destination system based on a push notification of the set of push/pull notifications, the source system for status information that indicates a status of a first event being performed in the source system, where the push notification indicates first metadata associated with the first event. The event-based synchronization component 520 may be configured as or otherwise support a means for retrieving, from the source system in accordance with the status of the first event and using the first metadata associated with the first event, first data that is modified by the first event. The event-based synchronization component 520 may be configured as or otherwise support a means for synchronizing a database of the destination system based on the first data retrieved from the source system. The event-based synchronization component 520 may be configured as or otherwise support a means for retrieving, from the source system based on a pull notification of the set of push/pull notifications, second data that is modified by a second event in the source system, where the pull notification indicates a type of the second event that is being performed in the source system. The event-based synchronization component 520 may be configured as or otherwise support a means for synchronizing the database of the destination system based on the second data retrieved from the source system.

By including or configuring the event-based synchronization component 520 in accordance with examples as described herein, the system 505 (e.g., a processor controlling or otherwise coupled with the input interface 510, the output interface 515, the event-based synchronization component 520, or a combination thereof) may support techniques for reduced processing, reduced latency associated with data synchronization, and improved synchronization between data environments.

Figure 6:
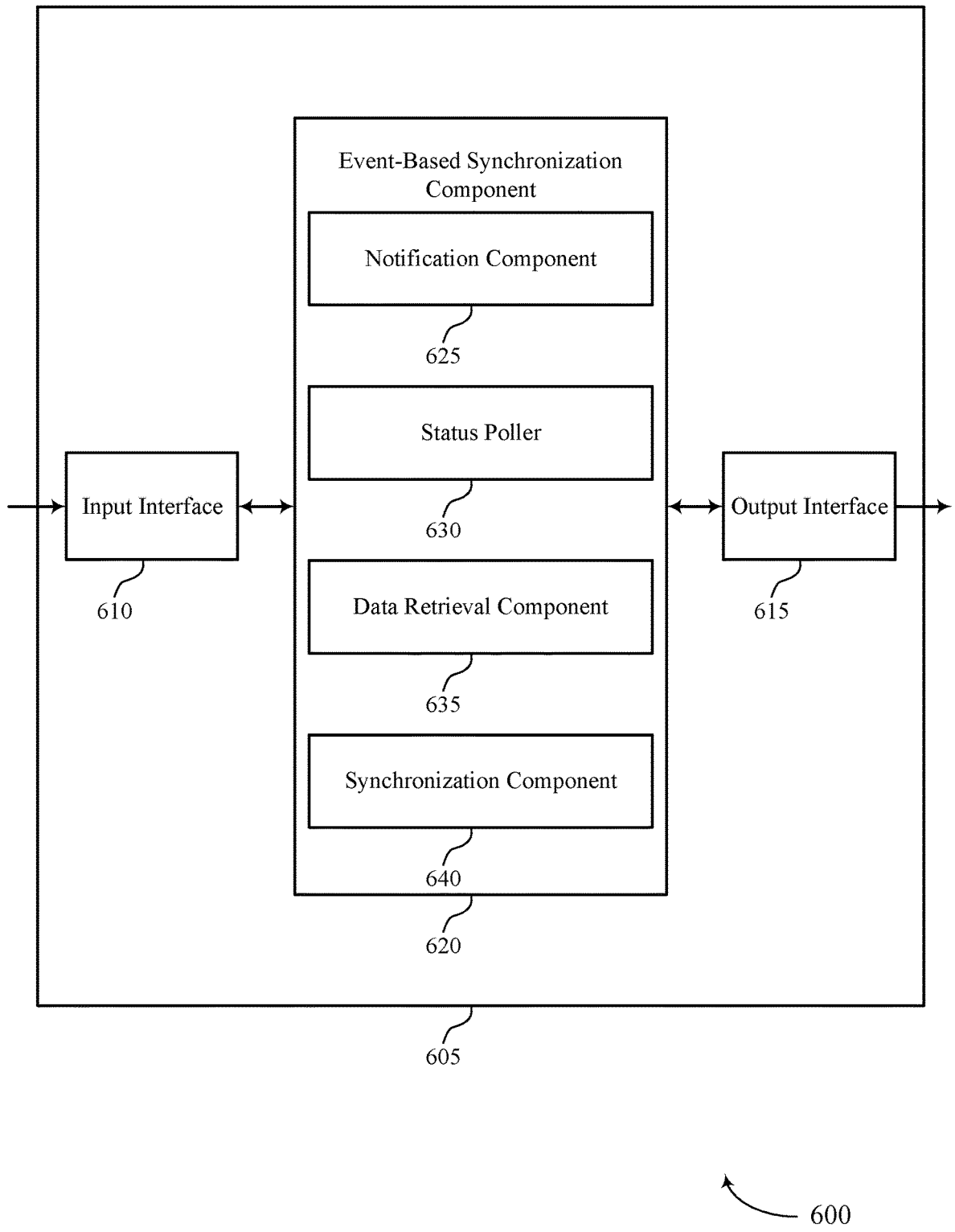

FIG. 6 illustrates a block diagram 600 of a system 605 that supports event-based data synchronization in accordance with aspects of the present disclosure. In some examples, the system 605 may be an example of aspects of one or more components described with reference to FIG. 1, such as a DMS 110. The system 605 may be an example of aspects of a system 505 or a DMS 110 as described herein. The system 605 may include an input interface 610, an output interface 615, and an event-based synchronization component 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the event-based synchronization component 620 to support event-based data synchronization. In some cases, the input interface 610 may be a component of a network interface 825 as described with reference to FIG. 8.

The output interface 615 may manage output signaling for the system 605. For example, the output interface 615 may receive signaling from other components of the system 605, such as the event-based synchronization component 620, and may transmit such output signaling corresponding to (e.g., representative of or otherwise based on) such signaling to other systems or devices. In some cases, the output interface 615 may be a component of a network interface 825 as described with reference to FIG. 8.

The system 605, or various components thereof, may be an example of means for performing various aspects of event-based data synchronization as described herein. For example, the event-based synchronization component 620 may include a notification component 625, a status poll component 630, a data retrieval component 635, a synchronization component 640, or any combination thereof. The event-based synchronization component 620 may be an example of aspects of an event-based synchronization component 520 as described herein. In some examples, the event-based synchronization component 620, or various components thereof, may be configured to perform various operations (e.g., receiving, monitoring, transmitting) using or otherwise in cooperation with the input interface 610, the output interface 615, or both. For example, the event-based synchronization component 620 may receive information from the input interface 610, send information to the output interface 615, or be integrated in combination with the input interface 610, the output interface 615, or both to receive information, transmit information, or perform various other operations as described herein.

The notification component 625 may be configured as or otherwise support a means for communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The status poll component 630 may be configured as or otherwise support a means for polling, by the destination system based on a push notification of the set of push/pull notifications, the source system for status information that indicates a status of a first event being performed in the source system, where the push notification indicates first metadata associated with the first event. The data retrieval component 635 may be configured as or otherwise support a means for retrieving, from the source system in accordance with the status of the first event and using the first metadata associated with the first event, first data that is modified by the first event. The synchronization component 640 may be configured as or otherwise support a means for synchronizing a database of the destination system based on the first data retrieved from the source system. The data retrieval component 635 may be configured as or otherwise support a means for retrieving, from the source system based on a pull notification of the set of push/pull notifications, second data that is modified by a second event in the source system, where the pull notification indicates a type of the second event that is being performed in the source system. The synchronization component 640 may be configured as or otherwise support a means for synchronizing the database of the destination system based on the second data retrieved from the source system.

Figure 7:
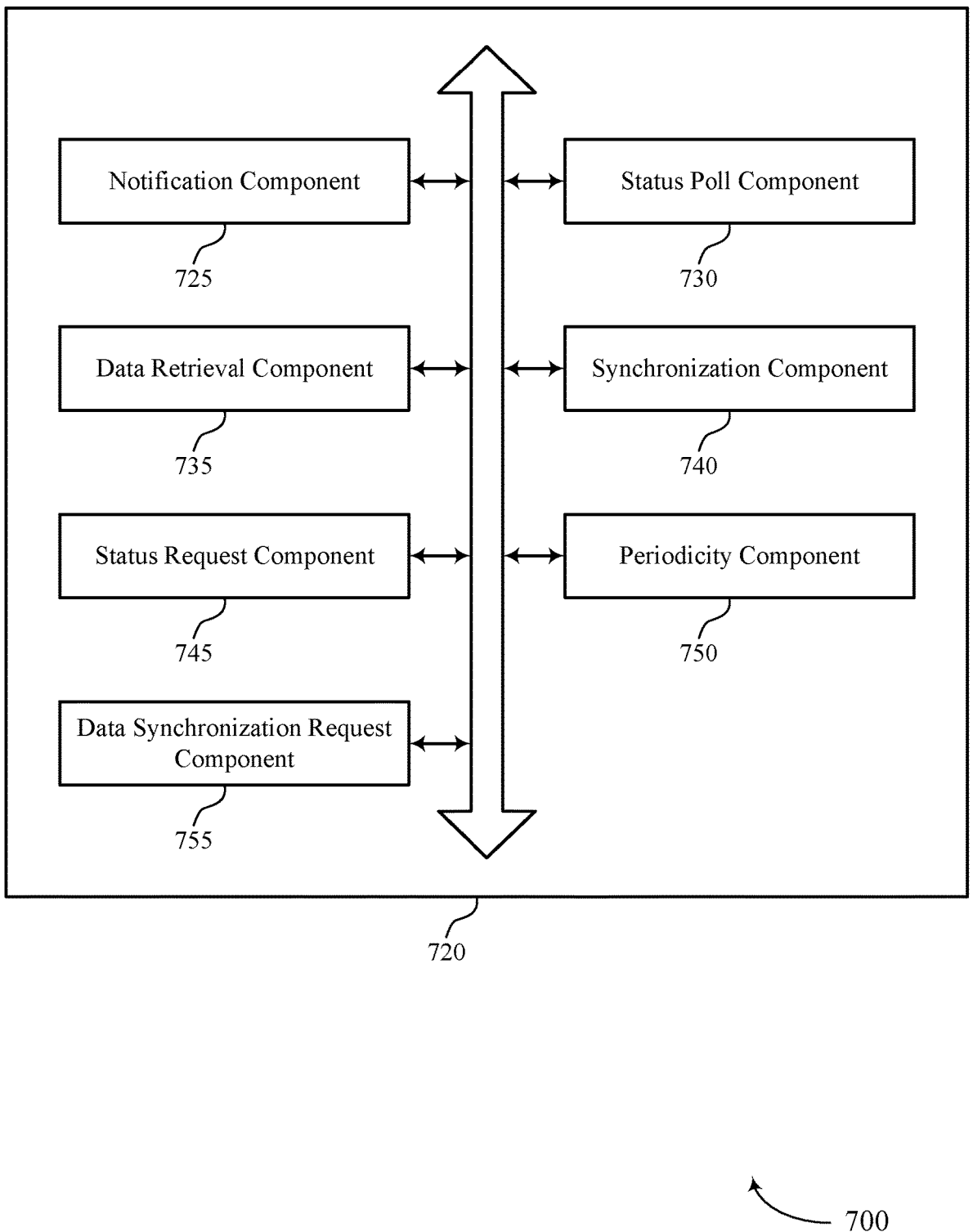
FIG. 7 illustrates a block diagram of an event-based synchronization component that supports event-based data synchronization in accordance with aspects of the present disclosure.

FIG. 7 illustrates a block diagram 700 of an event-based synchronization component 720 that supports event-based data synchronization in accordance with aspects of the present disclosure. The event-based synchronization component 720 may be an example of aspects of an event-based synchronization component 520, an event-based synchronization component 620, or both, as described herein. The event-based synchronization component 720, or various components thereof, may be an example of means for performing various aspects of event-based data synchronization as described herein. For example, the event-based synchronization component 720 may include a notification component 725, a status poll component 730, a data retrieval component 735, a synchronization component 740, a status request component 745, a periodicity component 750, a data synchronization request component 755, or any combination thereof. Each of these components may communicate, directly or indirectly, with one another (e.g., via one or more buses, communications links, communications interfaces, or any combination thereof).

The notification component 725 may be configured as or otherwise support a means for communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The status poll component 730 may be configured as or otherwise support a means for polling, by the destination system based on a push notification of the set of push/pull notifications, the source system for status information that indicates a status of a first event being performed in the source system, where the push notification indicates first metadata associated with the first event. The data retrieval component 735 may be configured as or otherwise support a means for retrieving, from the source system in accordance with the status of the first event and using the first metadata associated with the first event, first data that is modified by the first event. The synchronization component 740 may be configured as or otherwise support a means for synchronizing a database of the destination system based on the first data retrieved from the source system. In some examples, the data retrieval component 735 may be configured as or otherwise support a means for retrieving, from the source system based on a pull notification of the set of push/pull notifications, second data that is modified by a second event in the source system, where the pull notification indicates a type of the second event that is being performed in the source system. In some examples, the synchronization component 740 may be configured as or otherwise support a means for synchronizing the database of the destination system based on the second data retrieved from the source system.

In some examples, the notification component 725 may be configured as or otherwise support a means for transmitting, by the destination system, the push notification to the source system, where the push notification includes a request to initiate the first event in the source system.

In some examples, the status request component 745 may be configured as or otherwise support a means for generating, by the destination system based on the push notification, a status request including the first metadata associated with the first event.

In some examples, the status request component 745 may be configured as or otherwise support a means for publishing the status request to a message queue supported by the destination system, where polling the source system for the status information is based on retrieving the status request from the message queue.

In some examples, the status request component 745 may be configured as or otherwise support a means for storing, after generating the status request, the status request in the database of the destination system. In some examples, the status request component 745 may be configured as or otherwise support a means for retrieving the status request from the database of the destination system, where polling the source system for the status information is based on retrieving the status request from the database of the destination system.

In some examples, the first metadata indicates a first type of the first event, an identifier of the first event, a periodicity associated with the first event, or any combination thereof.

In some examples, to support retrieving the first data, the data retrieval component 735 may be configured as or otherwise support a means for retrieving the first data during execution of the first event in the source system based on the status information indicating that the first event is pending and a first type of the first event indicated via the first metadata, where the status information indicates a time duration for which the first event has been pending at the source system.

In some examples, to support retrieving the first data, the data retrieval component 735 may be configured as or otherwise support a means for retrieving the first data after a completion of the first event based on the status information indicating that the first event is complete and a first type of the first event indicated via the first metadata.

In some examples, to support polling the source system for the status information, the periodicity component 750 may be configured as or otherwise support a means for polling the source system in accordance with a periodicity, where the periodicity is based on previous data synchronization scenarios.

In some examples, to support polling the source system for the status information, the periodicity component 750 may be configured as or otherwise support a means for polling the source system in accordance with the periodicity for a first time period. In some examples, to support polling the source system for the status information, the periodicity component 750 may be configured as or otherwise support a means for polling the source system in accordance with a second periodicity different than the periodicity for a second time period after the first time period.

In some examples, the data synchronization request component 755 may be configured as or otherwise support a means for generating a data synchronization request based on the pull notification, where the data synchronization request includes second metadata associated with the second event. In some examples, the data synchronization request component 755 may be configured as or otherwise support a means for publishing the data synchronization request to a message queue supported by the destination system, where retrieving the second data from the source system is based on retrieving the data synchronization request from the message queue.

In some examples, to support retrieving the second data from the source system, the data retrieval component 735 may be configured as or otherwise support a means for retrieving the second data from the source system in accordance with second metadata associated with the second data, where the second metadata includes a snapshot metadata format based on the second event being associated with a snapshot.

In some examples, the pull notification includes second metadata that identifies the second data. In some examples, the second metadata indicates rows or tables of a database of the source system that are modified by the second event. In some examples, the pull notification includes second metadata that indicates a type of the second data that is modified by the second event. In some examples, retrieving the second data is based on the type of the second data.

Figure 8:
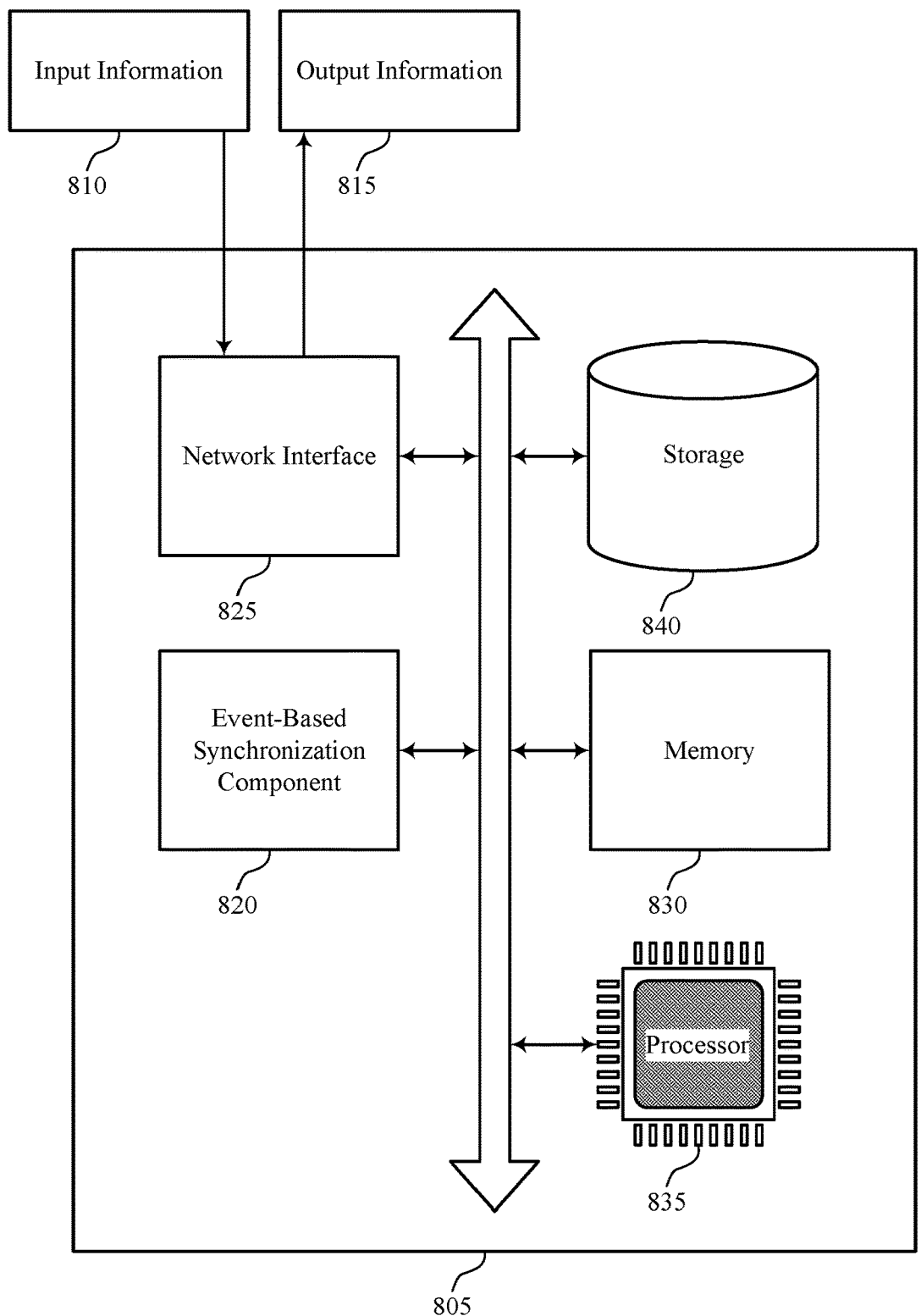
FIG. 8 illustrates a diagram of a system including a device that supports event-based data synchronization in accordance with aspects of the present disclosure.

FIG. 8 illustrates a block diagram 800 of a system 805 that supports event-based data synchronization in accordance with aspects of the present disclosure. The system 805 may be an example of or include the components of a system 505, a system 605, or a DMS as described herein. The system 805 may include components for data management, including components such as an event-based synchronization component 820, an input information 810, an output information 815, a network interface 825, a memory 830, a processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting event-based data synchronization). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the event-based synchronization component 820 may be configured as or otherwise support a means for communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The event-based synchronization component 820 may be configured as or otherwise support a means for polling, by the destination system based on a push notification of the set of push/pull notifications, the source system for status information that indicates a status of a first event being performed in the source system, where the push notification indicates first metadata associated with the first event. The event-based synchronization component 820 may be configured as or otherwise support a means for retrieving, from the source system in accordance with the status of the first event and using the first metadata associated with the first event, first data that is modified by the first event. The event-based synchronization component 820 may be configured as or otherwise support a means for synchronizing a database of the destination system based on the first data retrieved from the source system. The event-based synchronization component 820 may be configured as or otherwise support a means for retrieving, from the source system based on a pull notification of the set of push/pull notifications, second data that is modified by a second event in the source system, where the pull notification indicates a type of the second event that is being performed in the source system. The event-based synchronization component 820 may be configured as or otherwise support a means for synchronizing the database of the destination system based on the second data retrieved from the source system.

By including or configuring the event-based synchronization component 820 in accordance with examples as described herein, the system 805 may support techniques for event-based data synchronization, which may provide one or more benefits such as, for example, improved reliability, reduced latency, improved data synchronization, reduced power consumption, and more efficient utilization of computing resources, network resources or both, among other possibilities.

Figure 9:
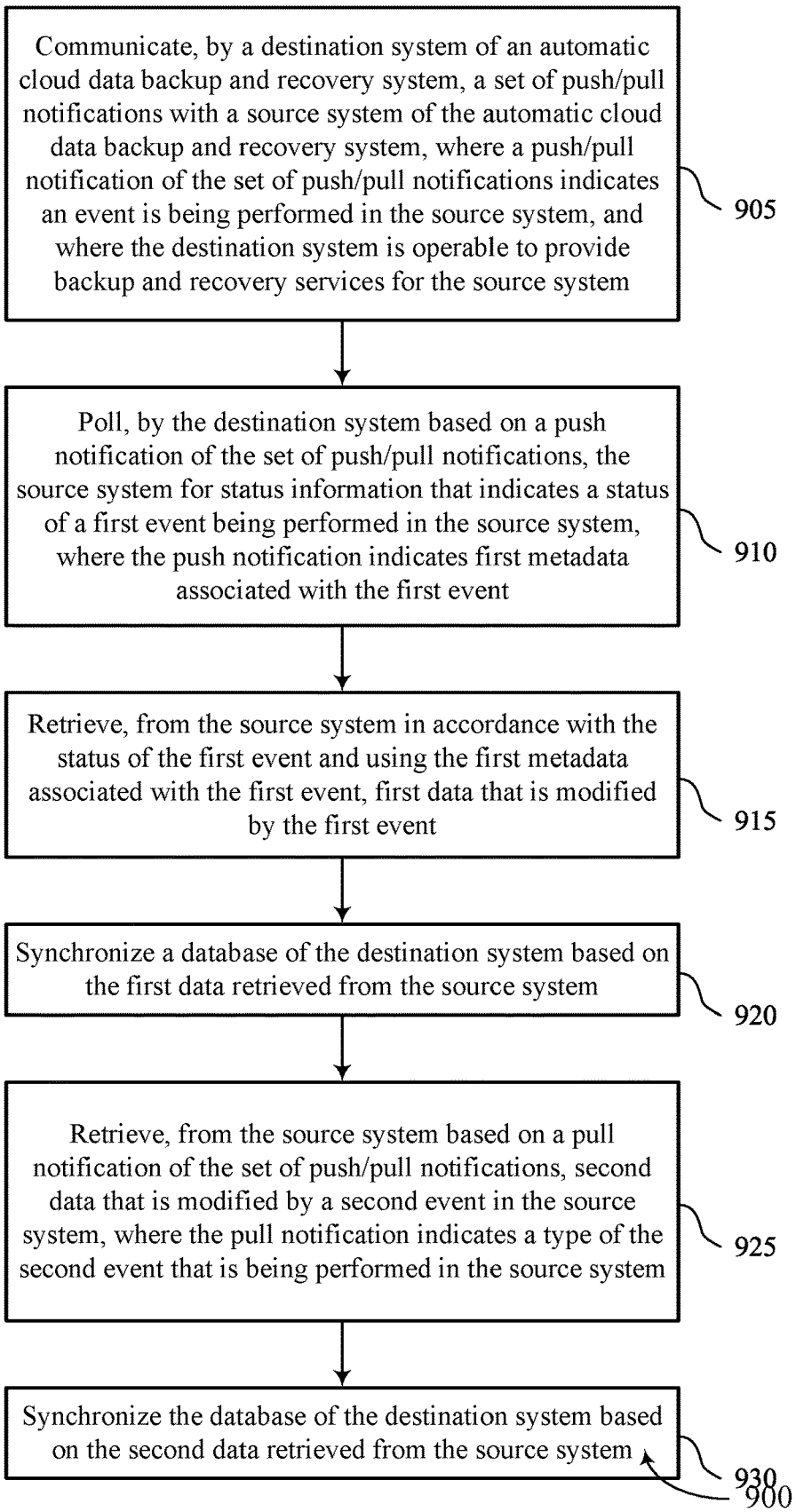
FIGS. 9 through 11 illustrate flowcharts showing methods that support event-based data synchronization in accordance with aspects of the present disclosure.

FIG. 9 illustrates a flowchart showing a method 900 that supports event-based data synchronization in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The operations of 905 may be performed in accordance with examples as disclosed herein. In some examples, aspects of the operations of 905 may be performed by a notification component 725 as described with reference to FIG. 7.

At 910, the method may include polling, by the destination system based on a push notification of the set of push/pull notifications, the source system for status information that indicates a status of a first event being performed in the source system, where the push notification indicates first metadata associated with the first event. The operations of 910 may be performed in accordance with examples as disclosed herein. In some examples, aspects of the operations of 910 may be performed by a status poll component 730 as described with reference to FIG. 7.

At 915, the method may include retrieving, from the source system in accordance with the status of the first event and using the first metadata associated with the first event, first data that is modified by the first event. The operations of 915 may be performed in accordance with examples as disclosed herein. In some examples, aspects of the operations of 915 may be performed by a data retrieval component 735 as described with reference to FIG. 7.

At 920, the method may include synchronizing a database of the destination system based on the first data retrieved from the source system. The operations of 920 may be performed in accordance with examples as disclosed herein. In some examples, aspects of the operations of 920 may be performed by a synchronization component 740 as described with reference to FIG. 7.

At 925, the method may include retrieving, from the source system based on a pull notification of the set of push/pull notifications, second data that is modified by a second event in the source system, where the pull notification indicates a type of the second event that is being performed in the source system. The operations of 925 may be performed in accordance with examples as disclosed herein. In some examples, aspects of the operations of 925 may be performed by a data retrieval component 735 as described with reference to FIG. 7.

At 930, the method may include synchronizing the database of the destination system based on the second data retrieved from the source system. The operations of 930 may be performed in accordance with examples as disclosed herein. In some examples, aspects of the operations of 930 may be performed by a synchronization component 740 as described with reference to FIG. 7.

Figure 10:
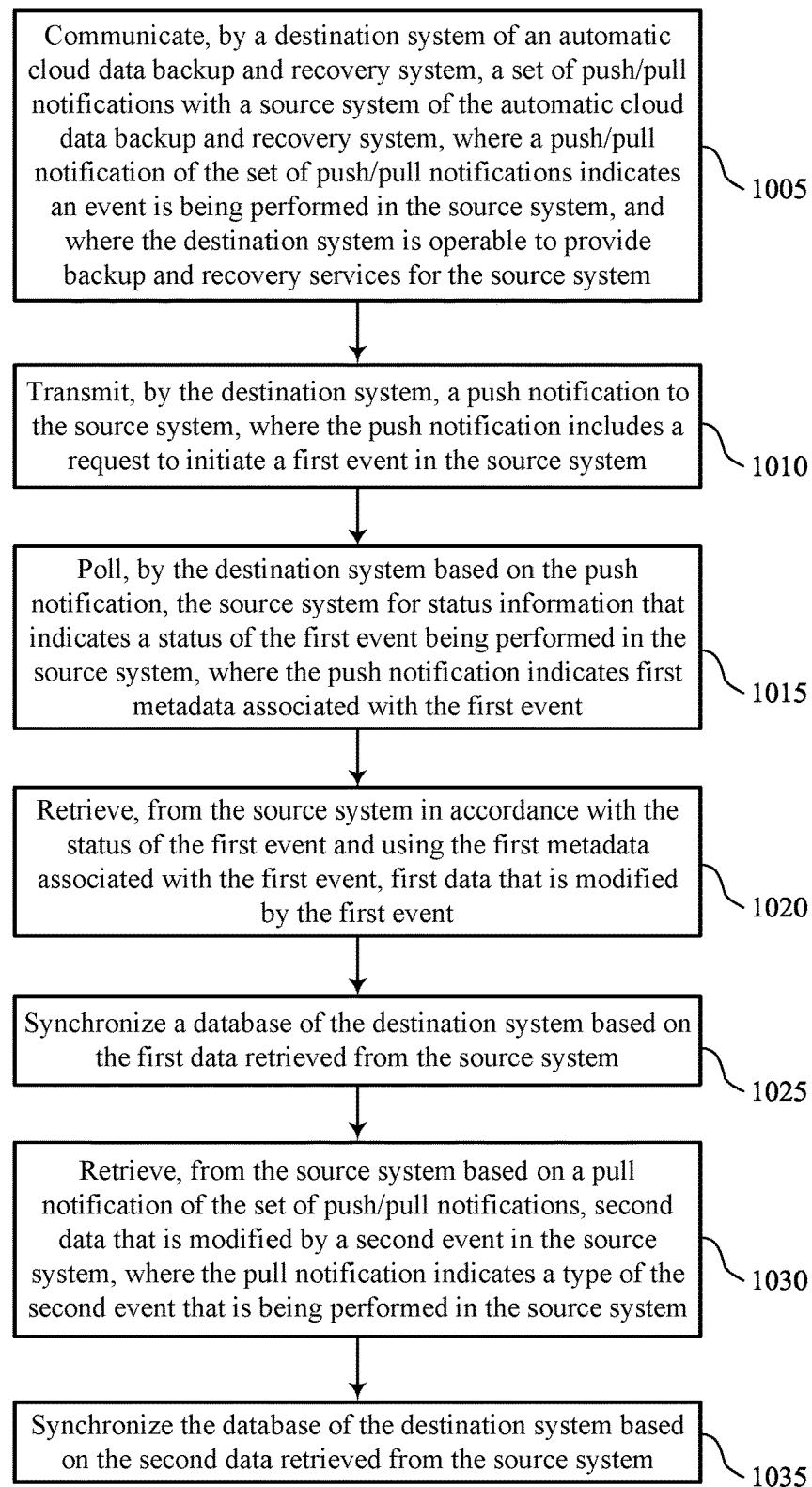

FIG. 10 illustrates a flowchart showing a method 1000 that supports event-based data synchronization in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The operations of 1005 may be performed in accordance with examples as disclosed herein. In some examples, aspects of the operations of 1005 may be performed by a notification component 725 as described with reference to FIG. 7.

At 1010, the method may include transmitting, by the destination system, a push notification of the set of push/pull notifications to the source system, where the push notification includes a request to initiate a first event in the source system. The operations of 1010 may be performed in accordance with examples as disclosed herein. In some examples, aspects of the operations of 1010 may be performed by a notification component 725 as described with reference to FIG. 7.

At 1015, the method may include polling, by the destination system based on the push notification, the source system for status information that indicates a status of the first event being performed in the source system, where the push notification indicates first metadata associated with the first event. The operations of 1015 may be performed in accordance with examples as disclosed herein. In some examples, aspects of the operations of 1015 may be performed by a status poll component 730 as described with reference to FIG. 7.

At 1020, the method may include retrieving, from the source system in accordance with the status of the first event and using the first metadata associated with the first event, first data that is modified by the first event. The operations of 1020 may be performed in accordance with examples as disclosed herein. In some examples, aspects of the operations of 1020 may be performed by a data retrieval component 735 as described with reference to FIG. 7.

At 1025, the method may include synchronizing a database of the destination system based on the first data retrieved from the source system. The operations of 1025 may be performed in accordance with examples as disclosed herein. In some examples, aspects of the operations of 1025 may be performed by a synchronization component 740 as described with reference to FIG. 7.

At 1030, the method may include retrieving, from the source system based on a pull notification of the set of push/pull notifications, second data that is modified by a second event in the source system, where the pull notification indicates a type of the second event that is being performed in the source system. The operations of 1030 may be performed in accordance with examples as disclosed herein. In some examples, aspects of the operations of 1030 may be performed by a data retrieval component 735 as described with reference to FIG. 7.

At 1035, the method may include synchronizing the database of the destination system based on the second data retrieved from the source system. The operations of 1035 may be performed in accordance with examples as disclosed herein. In some examples, aspects of the operations of 1035 may be performed by a synchronization component 740 as described with reference to FIG. 7.

Figure 11:
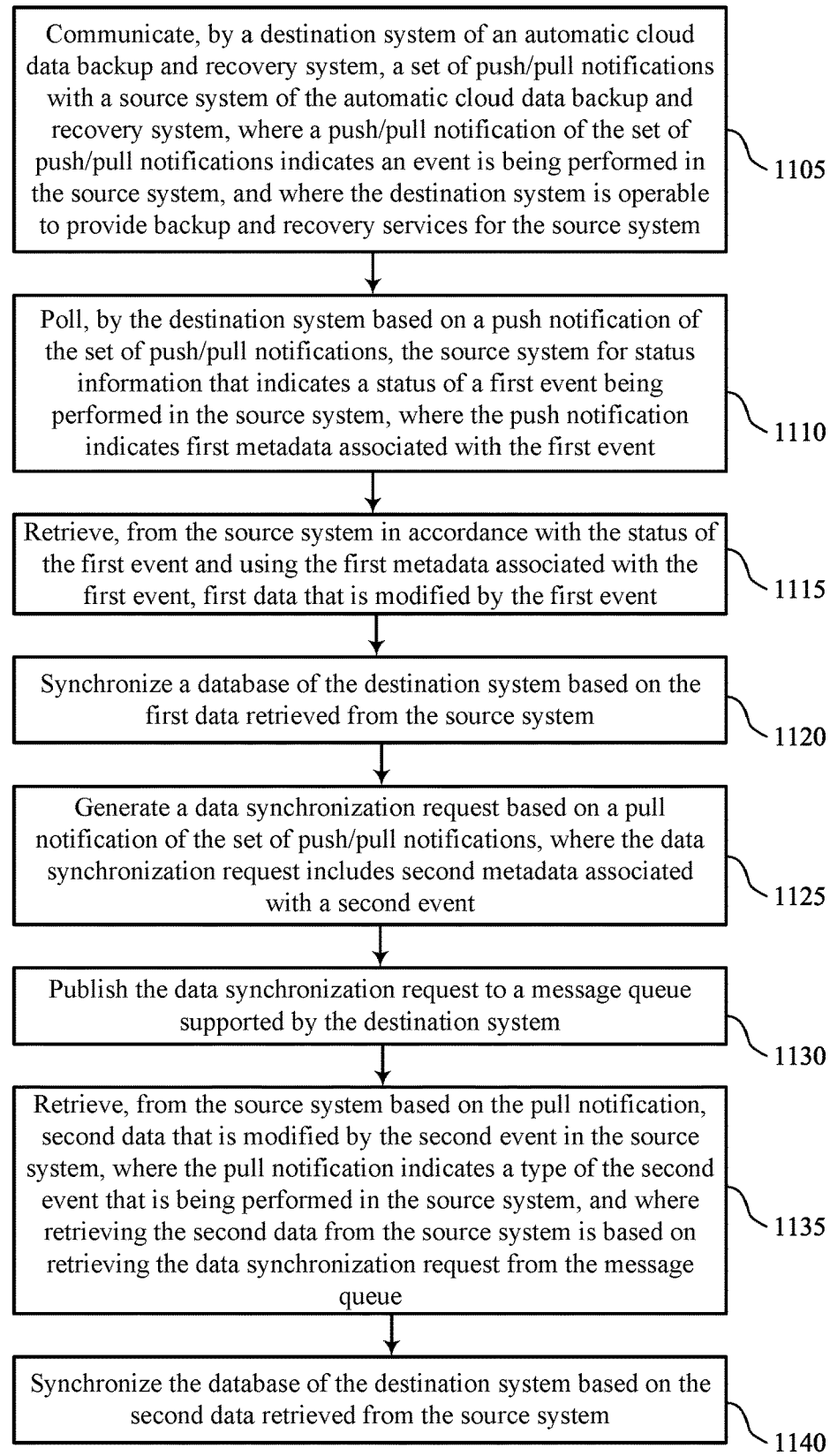

FIG. 11 illustrates a flowchart showing a method 1100 that supports event-based data synchronization in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system. The operations of 1105 may be performed in accordance with examples as disclosed herein. In some examples, aspects of the operations of 1105 may be performed by a notification component 725 as described with reference to FIG. 7.

At 1110, the method may include polling, by the destination system based on a push notification of the set of push/pull notifications, the source system for status information that indicates a status of a first event being performed in the source system, where the push notification indicates first metadata associated with the first event. The operations of 1110 may be performed in accordance with examples as disclosed herein. In some examples, aspects of the operations of 1110 may be performed by a status poll component 730 as described with reference to FIG. 7.

At 1115, the method may include retrieving, from the source system in accordance with the status of the first event and using the first metadata associated with the first event, first data that is modified by the first event. The operations of 1115 may be performed in accordance with examples as disclosed herein. In some examples, aspects of the operations of 1115 may be performed by a data retrieval component 735 as described with reference to FIG. 7.

At 1120, the method may include synchronizing a database of the destination system based on the first data retrieved from the source system. The operations of 1120 may be performed in accordance with examples as disclosed herein. In some examples, aspects of the operations of 1120 may be performed by a synchronization component 740 as described with reference to FIG. 7.

At 1125, the method may include generating a data synchronization request based on a pull notification of the set of push/pull notifications, where the data synchronization request includes second metadata associated with a second event. The operations of 1125 may be performed in accordance with examples as disclosed herein. In some examples, aspects of the operations of 1125 may be performed by a data synchronization request component 755 as described with reference to FIG. 7.

At 1130, the method may include publishing the data synchronization request to a message queue supported by the destination system. The operations of 1130 may be performed in accordance with examples as disclosed herein. In some examples, aspects of the operations of 1130 may be performed by a data synchronization request component 755 as described with reference to FIG. 7.

At 1135, the method may include retrieving, from the source system based on the pull notification, second data that is modified by the second event in the source system, where the pull notification indicates a type of the second event that is being performed in the source system, and where retrieving the second data from the source system is based on retrieving the data synchronization request from the message queue. The operations of 1135 may be performed in accordance with examples as disclosed herein. In some examples, aspects of the operations of 1135 may be performed by a data retrieval component 735 as described with reference to FIG. 7.

At 1140, the method may include synchronizing the database of the destination system based on the second data retrieved from the source system. The operations of 1140 may be performed in accordance with examples as disclosed herein. In some examples, aspects of the operations of 1140 may be performed by a synchronization component 740 as described with reference to FIG. 7.

A method is described. The method may include communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system, polling, by the destination system based on a push notification of the set of push/pull notifications, the source system for status information that indicates a status of a first event being performed in the source system, where the push notification indicates first metadata associated with the first event, retrieving, from the source system in accordance with the status of the first event and using the first metadata associated with the first event, first data that is modified by the first event, synchronizing a database of the destination system based on the first data retrieved from the source system, retrieving, from the source system based on a pull notification of the set of push/pull notifications, second data that is modified by a second event in the source system, where the pull notification indicates a type of the second event that is being performed in the source system, and synchronizing the database of the destination system based on the second data retrieved from the source system.

An apparatus is described. The apparatus may include a processor, memory coupled with the processor, and instructions stored in the memory. The instructions may be executable by the processor to cause the apparatus to communicate, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system, poll, by the destination system based on a push notification of the set of push/pull notifications, the source system for status information that indicates a status of a first event being performed in the source system, where the push notification indicates first metadata associated with the first event, retrieve, from the source system in accordance with the status of the first event and using the first metadata associated with the first event, first data that is modified by the first event, synchronize a database of the destination system based on the first data retrieved from the source system, retrieve, from the source system based on a pull notification of the set of push/pull notifications, second data that is modified by a second event in the source system, where the pull notification indicates a type of the second event that is being performed in the source system, and synchronize the database of the destination system based on the second data retrieved from the source system.

Another apparatus is described. The apparatus may include means for communicating, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system, means for polling, by the destination system based on a push notification of the set of push/pull notifications, the source system for status information that indicates a status of a first event being performed in the source system, where the push notification indicates first metadata associated with the first event, means for retrieving, from the source system in accordance with the status of the first event and using the first metadata associated with the first event, first data that is modified by the first event, means for synchronizing a database of the destination system based on the first data retrieved from the source system, means for retrieving, from the source system based on a pull notification of the set of push/pull notifications, second data that is modified by a second event in the source system, where the pull notification indicates a type of the second event that is being performed in the source system, and means for synchronizing the database of the destination system based on the second data retrieved from the source system.

A non-transitory computer-readable medium storing code is described. The code may include instructions executable by a processor to communicate, by a destination system of an automatic cloud data backup and recovery system, a set of push/pull notifications with a source system of the automatic cloud data backup and recovery system, where a push/pull notification of the set of push/pull notifications indicates an event is being performed in the source system, and where the destination system is operable to provide backup and recovery services for the source system, poll, by the destination system based on a push notification of the set of push/pull notifications, the source system for status information that indicates a status of a first event being performed in the source system, where the push notification indicates first metadata associated with the first event, retrieve, from the source system in accordance with the status of the first event and using the first metadata associated with the first event, first data that is modified by the first event, synchronize a database of the destination system based on the first data retrieved from the source system, retrieve, from the source system based on a pull notification of the set of push/pull notifications, second data that is modified by a second event in the source system, where the pull notification indicates a type of the second event that is being performed in the source system, and synchronize the database of the destination system based on the second data retrieved from the source system.

Some examples of the method, apparatuses, and non-transitory computer-readable medium described herein may further include operations, features, means, or instructions for transmitting, by the destination system, the push notification to the source system, where the push notification includes a request to initiate the first event in the source system.

Some examples of the method, apparatuses, and non-transitory computer-readable medium described herein may further include operations, features, means, or instructions for generating, by the destination system based on the push notification, a status request including the first metadata associated with the first event.

Some examples of the method, apparatuses, and non-transitory computer-readable medium described herein may further include operations, features, means, or instructions for publishing the status request to a message queue supported by the destination system, where polling the source system for the status information may be based on retrieving the status request from the message queue.

Some examples of the method, apparatuses, and non-transitory computer-readable medium described herein may further include operations, features, means, or instructions for storing, after generating the status request, the status request in the database of the destination system and retrieving the status request from the database of the destination system, where polling the source system for the status information may be based on retrieving the status request from the database of the destination system.

In some examples of the method, apparatuses, and non-transitory computer-readable medium described herein, the first metadata indicates a first type of the first event, an identifier of the first event, a periodicity associated with the first event, or any combination thereof.

In some examples of the method, apparatuses, and non-transitory computer-readable medium described herein, retrieving the first data may include operations, features, means, or instructions for retrieving the first data during execution of the first event in the source system based on the status information indicating that the first event may be pending and a first type of the first event indicated via the first metadata, where the status information indicates a time duration for which the first event may have been pending at the source system.

In some examples of the method, apparatuses, and non-transitory computer-readable medium described herein, retrieving the first data may include operations, features, means, or instructions for retrieving the first data after a completion of the first event based on the status information indicating that the first event may be complete and a first type of the first event indicated via the first metadata.

In some examples of the method, apparatuses, and non-transitory computer-readable medium described herein, polling the source system for the status information may include operations, features, means, or instructions for polling the source system in accordance with a periodicity, where the periodicity may be based on previous data synchronization scenarios.

In some examples of the method, apparatuses, and non-transitory computer-readable medium described herein, polling the source system for the status information may include operations, features, means, or instructions for polling the source system in accordance with the periodicity for a first time period and polling the source system in accordance with a second periodicity different than the periodicity for a second time period after the first time period.

Some examples of the method, apparatuses, and non-transitory computer-readable medium described herein may further include operations, features, means, or instructions for generating a data synchronization request based on the pull notification, where the data synchronization request includes second metadata associated with the second event and publishing the data synchronization request to a message queue supported by the destination system, where retrieving the second data from the source system may be based on retrieving the data synchronization request from the message queue.

In some examples of the method, apparatuses, and non-transitory computer-readable medium described herein, retrieving the second data from the source system may include operations, features, means, or instructions for retrieving the second data from the source system in accordance with second metadata associated with the second data, where the second metadata includes a snapshot metadata format based on the second event being associated with a snapshot.

In some examples of the method, apparatuses, and non-transitory computer-readable medium described herein, the pull notification includes second metadata that identifies the second data and the second metadata indicates rows or tables of a database of the source system that may be modified by the second event.

In some examples of the method, apparatuses, and non-transitory computer-readable medium described herein, the pull notification includes second metadata that indicates a type of the second data that may be modified by the second event and retrieving the second data may be based on the type of the second data.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
communicating, by a destination system of an automatic cloud data backup and recovery system, a set of notifications with a source system of the automatic cloud data backup and recovery system, wherein a push or pull notification of the set of notifications indicates an event is being performed in the source system, and wherein the destination system is operable to provide backup and recovery services for the source system;
transmitting, by the destination system based at least in part on a push notification of the set of notifications, a status request to the source system for status information that indicates a status of a first event being performed in the source system, wherein the push notification indicates first metadata associated with the first event;
retrieving, from the source system in accordance with the status of the first event and using the first metadata associated with the first event, first data that is modified by the first event;
synchronizing a database of the destination system based at least in part on the first data retrieved from the source system;
retrieving, from the source system based at least in part on a pull notification of the set of notifications, second data that is modified by a second event in the source system, wherein the pull notification indicates a type of the second event that is being performed in the source system; and
synchronizing the database of the destination system based at least in part on the second data retrieved from the source system.

2. The method of claim 1, further comprising:
transmitting, by the destination system, the push notification to the source system, wherein the push notification comprises a request to initiate the first event in the source system.

3. The method of claim 1, further comprising:
generating, by the destination system based at least in part on the push notification, the status request comprising the first metadata associated with the first event.

4. The method of claim 3, further comprising:
publishing the status request to a message queue supported by the destination system, wherein polling the source system for the status information is based at least in part on retrieving the status request from the message queue.

5. The method of claim 3, further comprising:
storing, after generating the status request, the status request in the database of the destination system; and
retrieving the status request from the database of the destination system, wherein polling the source system for the status information is based at least in part on retrieving the status request from the database of the destination system.

6. The method of claim 3, wherein the first metadata indicates a first type of the first event, an identifier of the first event, a periodicity associated with the first event, or any combination thereof.

7. The method of claim 1, wherein retrieving the first data comprises:
retrieving the first data during execution of the first event in the source system based at least in part on the status information indicating that the first event is pending and a first type of the first event indicated via the first metadata, wherein the status information indicates a time duration for which the first event has been pending at the source system.

8. The method of claim 1, wherein retrieving the first data comprises:
retrieving the first data after a completion of the first event based at least in part on the status information indicating that the first event is complete and a first type of the first event indicated via the first metadata.

9. The method of claim 1, wherein polling the source system for the status information comprises:
polling the source system in accordance with a periodicity, wherein the periodicity is based at least in part on previous data synchronization scenarios.

10. The method of claim 9, wherein polling the source system for the status information comprises:
polling the source system in accordance with the periodicity for a first time period; and
polling the source system in accordance with a second periodicity different than the periodicity for a second time period after the first time period.

11. The method of claim 1, further comprising:
generating a data synchronization request based at least in part on the pull notification, wherein the data synchronization request comprises second metadata associated with the second event; and
publishing the data synchronization request to a message queue supported by the destination system, wherein retrieving the second data from the source system is based at least in part on retrieving the data synchronization request from the message queue.

12. The method of claim 1, wherein retrieving the second data from the source system comprises:
retrieving the second data from the source system in accordance with second metadata associated with the second data, wherein the second metadata comprises a snapshot metadata format based at least in part on the second event being associated with a snapshot.

13. The method of claim 1, wherein:
the pull notification comprises second metadata that identifies the second data; and
the second metadata indicates rows or tables of a database of the source system that are modified by the second event.

14. The method of claim 1, wherein:
the pull notification comprises second metadata that indicates a type of the second data that is modified by the second event; and
retrieving the second data is based at least in part on the type of the second data.

15. An apparatus, comprising:
a processor;
memory coupled with the processor; and
instructions stored in the memory and executable by the processor to cause the apparatus to:
communicate, by a destination system of an automatic cloud data backup and recovery system, a set of notifications with a source system of the automatic cloud data backup and recovery system, wherein a push or pull notification of the set of notifications indicates an event is being performed in the source system, and wherein the destination system is operable to provide backup and recovery services for the source system;

transmit, by the destination system based at least in part on a push notification of the set of notifications, a status request to the source system for status information that indicates a status of a first event being performed in the source system, wherein the push notification indicates first metadata associated with the first event;

retrieve, from the source system in accordance with the status of the first event and using the first metadata associated with the first event, first data that is modified by the first event;

synchronize a database of the destination system based at least in part on the first data retrieved from the source system;

retrieve, from the source system based at least in part on a pull notification of the set of notifications, second data that is modified by a second event in the source system, wherein the pull notification indicates a type of the second event that is being performed in the source system; and synchronize the database of the destination system based at least in part on the second data retrieved from the source system.

16. The apparatus of claim 15, wherein the instructions are further executable by the processor to cause the apparatus to:

transmit, by the destination system, the push notification to the source system, wherein the push notification comprises a request to initiate the first event in the source system.

17. The apparatus of claim 15, wherein the instructions are further executable by the processor to cause the apparatus to:

generate, by the destination system based at least in part on the push notification, the status request comprising the first metadata associated with the first event.

18. The apparatus of claim 15, wherein the instructions are further executable by the processor to cause the apparatus to:

generate a data synchronization request based at least in part on the pull notification, wherein the data synchronization request comprises second metadata associated with the second event; and publish the data synchronization request to a message queue supported by the destination system, wherein retrieving the second data from the source system is based at least in part on retrieving the data synchronization request from the message queue.

19. A non-transitory computer-readable medium storing code, the code comprising instructions executable by a processor to:

communicate, by a destination system of an automatic cloud data backup and recovery system, a set of notifications with a source system of the automatic cloud data backup and recovery system, wherein a push or pull notification of the set of notifications indicates an event is being performed in the source system, and wherein the destination system is operable to provide backup and recovery services for the source system;

transmit, by the destination system based at least in part on a push notification of the set of notifications, a status request to the source system for status information that indicates a status of a first event being performed in the source system, wherein the push notification indicates first metadata associated with the first event;

retrieve, from the source system in accordance with the status of the first event and using the first metadata associated with the first event, first data that is modified by the first event;

synchronize a database of the destination system based at least in part on the first data retrieved from the source system;

retrieve, from the source system based at least in part on a pull notification of the set of notifications, second data that is modified by a second event in the source system, wherein the pull notification indicates a type of the second event that is being performed in the source system; and synchronize the database of the destination system based at least in part on the second data retrieved from the source system.

20. The non-transitory computer-readable medium of claim 19, wherein the instructions are further executable by the processor to:

transmit, by the destination system, the push notification to the source system, wherein the push notification comprises a request to initiate the first event in the source system.

* * * * *